United States Patent
Synal

(10) Patent No.: US 10,505,992 B2
(45) Date of Patent: Dec. 10, 2019

(54) BOT PROFILE DISCOVERY

(71) Applicant: T-Mobile USA, Inc., Bellevue, WA (US)

(72) Inventor: Adrian Synal, Kirkland, WA (US)

(73) Assignee: T-Mobile USA, Inc., Bellevue, WA (US)

(\*) Notice: Subject to any disclaimer, the term of this patent is extended or adjusted under 35 U.S.C. 154(b) by 68 days.

(21) Appl. No.: 15/644,398

(22) Filed: Jul. 7, 2017

(65) Prior Publication Data

US 2019/0014155 A1    Jan. 10, 2019

(51) Int. Cl.
*H04L 29/06* (2006.01)
*H04L 29/08* (2006.01)
*H04M 7/00* (2006.01)

(52) U.S. Cl.
CPC ...... *H04L 65/1006* (2013.01); *H04L 65/1083* (2013.01); *H04L 65/4007* (2013.01); *H04L 67/02* (2013.01); *H04L 67/28* (2013.01); *H04L 67/2838* (2013.01); *H04M 7/006* (2013.01)

(58) Field of Classification Search
CPC ............. H04L 65/1006; H04L 65/1083; H04L 65/4007
See application file for complete search history.

(56) References Cited

U.S. PATENT DOCUMENTS

| 7,734,028 | B2 * | 6/2010 | Dhara | H04L 29/06 379/142.04 |
| 2005/0233733 | A1 * | 10/2005 | Roundtree | G06F 9/45512 455/414.1 |
| 2007/0150773 | A1 * | 6/2007 | Srivastava | H04L 51/12 714/49 |
| 2009/0264112 | A1 | 10/2009 | De Zen et al. | |
| 2012/0090030 | A1 | 4/2012 | Rapaport et al. | |
| 2012/0272232 | A1 | 10/2012 | Song | |
| 2015/0294361 | A1 | 10/2015 | Yedidim | |

FOREIGN PATENT DOCUMENTS

WO    WO2016179205    11/2016

OTHER PUBLICATIONS

PCT Search Report and Written Opinion dated Oct. 15, 2018, for PCT Application No. PCT/US18/39799, 14 pages.

\* cited by examiner

*Primary Examiner* — Nafiz E Hoque
(74) *Attorney, Agent, or Firm* — Lee & Hayes, P.C.

(57) ABSTRACT

Systems and methods directed to discovery by a user equipment (UE) of a bot functionality available from an entity during a call set up between the UE and the entity are provided. The UE may initiate call the entity, for example a business, using a session initiation protocol (SIP) in a communication network, and, as a part of SIP signaling, an operator of the communication network may add to a SIP header a profile of the bot functionality offered by the business, which is forwarded to the UE. Once the UE processes the information included in the profile, the UE and the business may communicate using the bot functionality.

20 Claims, 4 Drawing Sheets

BOT PROFILE DISCOVERY

BACKGROUND

Modern telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. The 5G telecommunication technologies are the next generation mobile networks that are designed to combine both an evolution and revolution of the existing LTE/LTE-A mobile networks to provide a much higher connectivity, greater throughput, much lower latency, and ultra-high reliability to support new use cases and applications. Some of mobile devices operating in such telecommunication systems are also capable of operating over Wi-Fi networks for voice, also known as Voice-over-IP (VoIP) and data.

The Session Initiation Protocol (SIP) is utilized in the modern telecommunication networks such as Internet Protocol (IP) networks, and is cable of controlling multimedia communication sessions, such as videos, video calls, instant messaging, social media communications, and the like. A business may take advantage of the SIP capabilities and provide to its customers an option to communicate with the business via a bot functionality, such as a chatbot, which is able to perform automated tasks. However, the customers may not always be aware of the availability of the bot functionality.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods discussed herein are directed to discovery by a user equipment (UE) of a bot functionality available from an entity during a call set up between the UE and the entity.

For example, a user of the UE may call a pizzeria to order a pizza from the UE. This call may be made using a session initiation protocol (SIP) in a communication network, and, as a part of SIP signaling, an operator of the communication network may add to a SIP header a profile of the bot functionality offered by the pizzeria, which is forwarded to the UE. The pizzeria may have an agreement with the operator to add the bot profile of the bot functionality to the call. The profile may be a vCard, a personal contact card (PCC), a uniform resource locator (URL), and the like, that identifies availability of the bot functionality for the UE. Once the UE processes the information included in the profile, by downloading a chat program identified in the profile from a bot information server for example, the user may be prompted to "chat" with the pizzeria for future orders. Similarly, the pizzeria, having the bot functionality available for its customers, may initiate a call to another UE of another customer. As a part of SIP signaling, the operator of the communication network may add to a SIP header the profile of the bot functionality offered by the pizzeria, which is forwarded to the other UE. Once the other UE processes the information included in the profile, the other user may be prompted to "chat" with the pizzeria for future orders.

Figure 1:
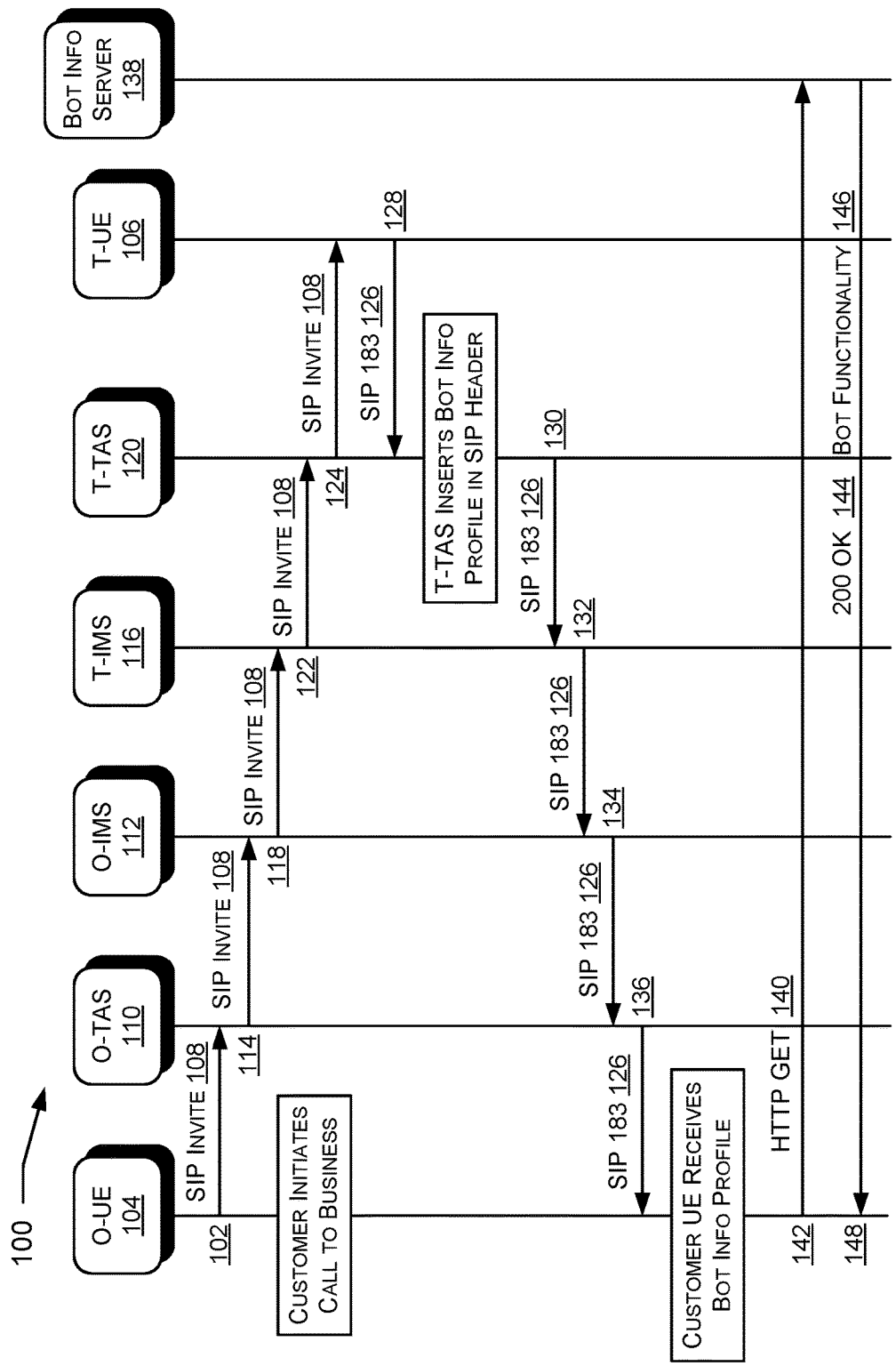
FIG. 1 illustrates an example flow diagram for discovering a bot functionality available from an entity by a user equipment (UE) during a call set up initiated by the UE to the entity in a communication network.

FIG. 1 illustrates an example flow diagram 100 for discovering a bot functionality available from an entity by a user equipment (UE) during a call set up between the UE and the entity in a communication network. The UE may be a UE of a customer and may be interchangeably referred as a first UE or a customer UE. The entity may be another UE belonging to a business that has the bot functionality, and may be interchangeably referred as a second UE or a business UE, which includes any device associated with the bot profile capable of the bot functionality. The communication network may be a landline network, a wireless network, or a combination of the land and wireless networks, utilizing the Internet protocol (IP).

At 102, the customer may place a call to the business, that is, the customer UE, illustrated as an originating UE (O-UE) 104, initiates a call to the business UE, illustrated as a terminating UE (T-UE) 106. The call is shown as being initiated using a session initiation protocol (SIP) INVITE 108 from the O-UE 104 to an originating telephony application server (O-TAS) 110, however, the call may be initiated using a phone call, an instant messaging, a uniform resource indicator (URI), and the like. The O-UE 104 may be configured to request an operator of the communication network to add the bot information profile to the call, if available during the call setup.

The SIP INVITE 108 may be forwarded ultimately to the business UE, the T-UE 106, as follows: from the O-TAS 110 to an originating IP multimedia subsystem (O-IMS) 112 at 114, from the O-IMS 112 to a terminating IMS (T-IMS) 116 at 118, from the T-IMS 116 to a terminating TAS (T-TAS) 120 at 122, and from the T-TAS 120 to the T-UE 106 at 124.

In response to receiving the SIP INVITE 108, the T-UE 106, the business UE with the bot functionality, may send a response, such as a SIP 183 response 126, to the T-TAS 120 at 128. Upon detecting the SIP 183 response 126 from the T-UE 106, the T-TAS 120 may add, or insert, a bot information profile associated with the bot functionality of the T-UE 106 to the SIP 183 response 126 at 130, and forwards the SIP 183 response 126 to the T-IMS 116. The T-TAS 120 may insert the bot information profile to the SIP 183 response 126 by inserting a personal contact card (PCC) value, vCard, or a uniform resource locator (URL) in the SIP header, each of which may identify the bot information profile associated with the T-UE 106. The SIP 183 response 126, having the SIP header with the bot information profile, may be forwarded ultimately to the O-UE 104, the customer UE, as follows: from the T-IMS 116 to O-IMS 112 at 132, from the O-IMS 112 to the O-TAS 110 at 134, and from the O-TAS 110 to O-UE 104 at 136.

When the O-UE 104, the customer UE, receives the SIP 183 response 126, the O-UE 104 may be provided with the bot information profile associated with the bot functionality of the T-UE 106, the business UE, based on the SIP header of the SIP 183 response 126. The call setup process may then be completed and the O-UE 104, the customer UE, and the T-UE 106, the business UE, may now communicate with each other according to the way the call was initiated.

Alternatively, or additionally, the O-UE 104 may then request to download an application associated with the bot functionality from a bot information server 138, for example, by issuing a HTTP GET command 140 at 142, and receiving a 200 OK response 144 and the application or program for the bot functionality 146 downloaded to the O-UE 104 at 148. After the O-UE 104 downloads the bot functionality 146, the O-UE 104, the customer UE, and the T-UE 106, the business UE, may now communicate to each other using the bot functionality 146, such as chat.

Figure 2:
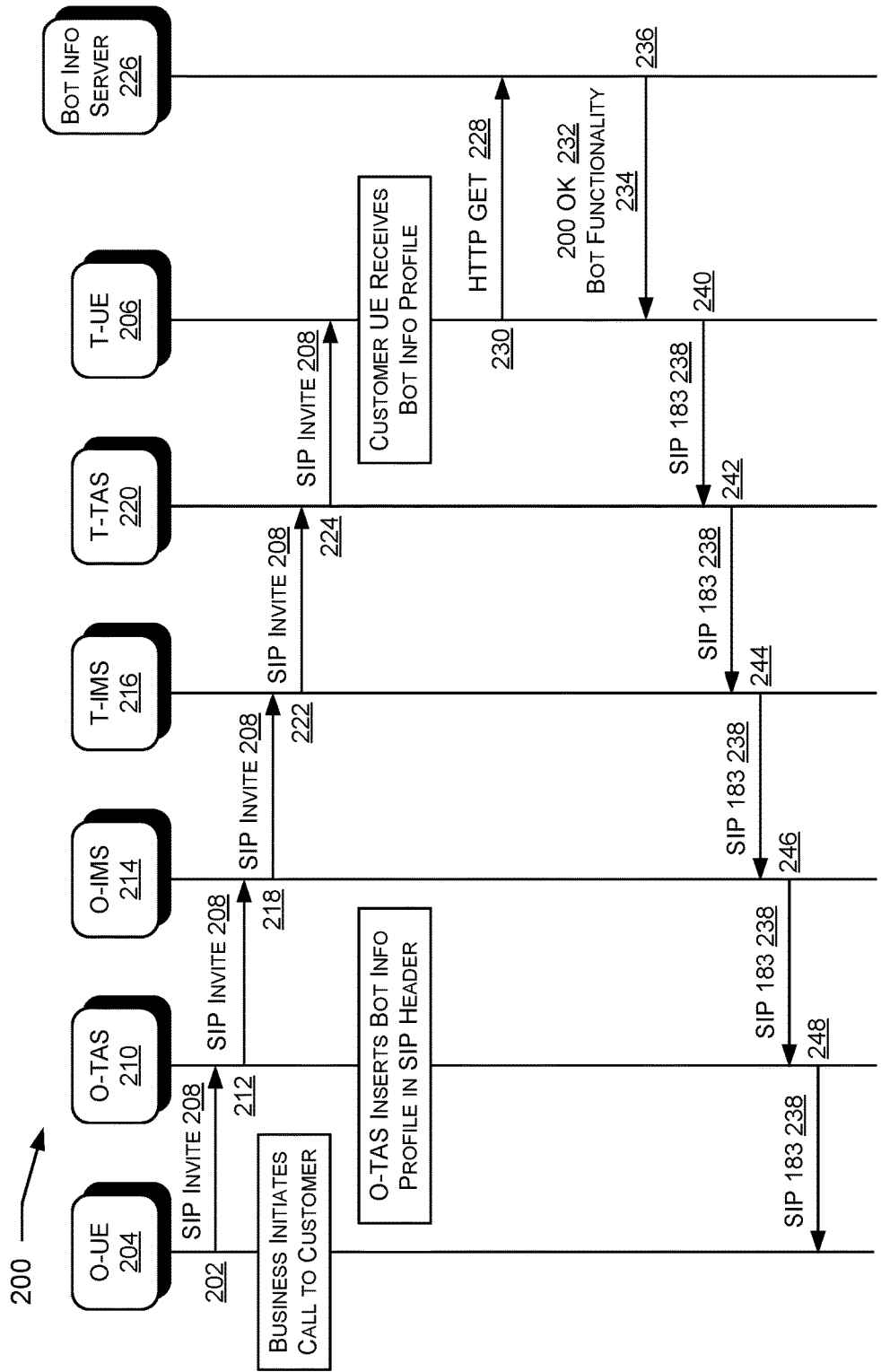
FIG. 2 illustrates an example flow diagram for discovering the bot functionality available from the entity by the UE during a call set up initiated by the entity to the UE in the communication network.

FIG. 2 illustrates an example flow diagram 200 for discovering the bot functionality 146 available from the business UE by the customer UE of during a call set up initiated by the business UE to the customer UE in the communication network.

At 202, the business may place a call to one of its customers, that is, the business UE, illustrated as an O-UE 204, initiates a call to the customer UE, illustrated as a T-UE 206. The call is shown as being initiated using a SIP INVITE 208 from the O-UE 204 to an O-TAS 210, however, the call may be initiated using a phone call, an instant messaging, a URI, and the like. The business may have an agreement with the operator of the communication network to add the bot information profile to outgoing calls, and at 212, the O-TAS 210 may add, or insert, the bot information profile associated with the bot functionality of the O-UE 204, the business UE, to the SIP INVITE 208 and forwards the SIP INVITE 208 to an O-IMS 214. The O-TAS 210 may insert the bot information profile to the SIP INVITE 208 by inserting a PCC value, vCard, or a URL in the SIP header, each of which may identify the bot information profile associated with the O-UE 204.

The SIP INVIE 208, having the SIP header with the bot information profile, may be forwarded ultimately to the T-UE 206 as follows: from the O-IMS 214 to a T-IMS 216 at 218, from the T-IMS 216 to a T-TAS 220 at 222, and from the T-TAS 220 to the T-UE 206 at 224.

When the T-UE 206, the customer UE, receives the SIP INVITE 208, the T-UE 206 may be provided with the bot information profile associated with the bot functionality of the O-UE 204, the business UE, based on the SIP header of the SIP INVITE 208. The T-UE 206 may then request to download an application associated with the bot functionality from a bot information server 226 by issuing a HTTP GET command 228 at 230, and receive a 200 OK response 232 and the application or program for the bot functionality 234 downloaded to the T-UE 206 at 236. Alternatively, the T-UE 206, that is the customer, may wait to request to download the bot functionality from a bot information server 226 till some later time, or may choose not to download the bot functionality.

In response to receiving the bot information via the SIP Invite 208, the T-UE 206 may send a response, such as a SIP 183 response 238, to T-TAS 220 at 240. The SIP 183 response 238 may be forwarded ultimately to the O-UE 204, the business UE, as follows: from the T-TAS 220 to T-IMS 216 at 242, from the T-IMS 216 to the O-IMS 214 at 244, from the O-IMS 214 to O-TAS 210 at 246, and from the O-TAS 210 to O-UE 204 at 248. The call setup process may then be completed and the O-UE 204, the business UE, and the T-UE 206, the customer UE, may now communicate with each other according to the way the call was initiated. After the T-UE 206 downloads the bot functionality 146, the O-UE 204, the business UE, and the T-UE 206, the customer UE, may now communicate to each other using the bot functionality 146, such as chat.

Figure 3:
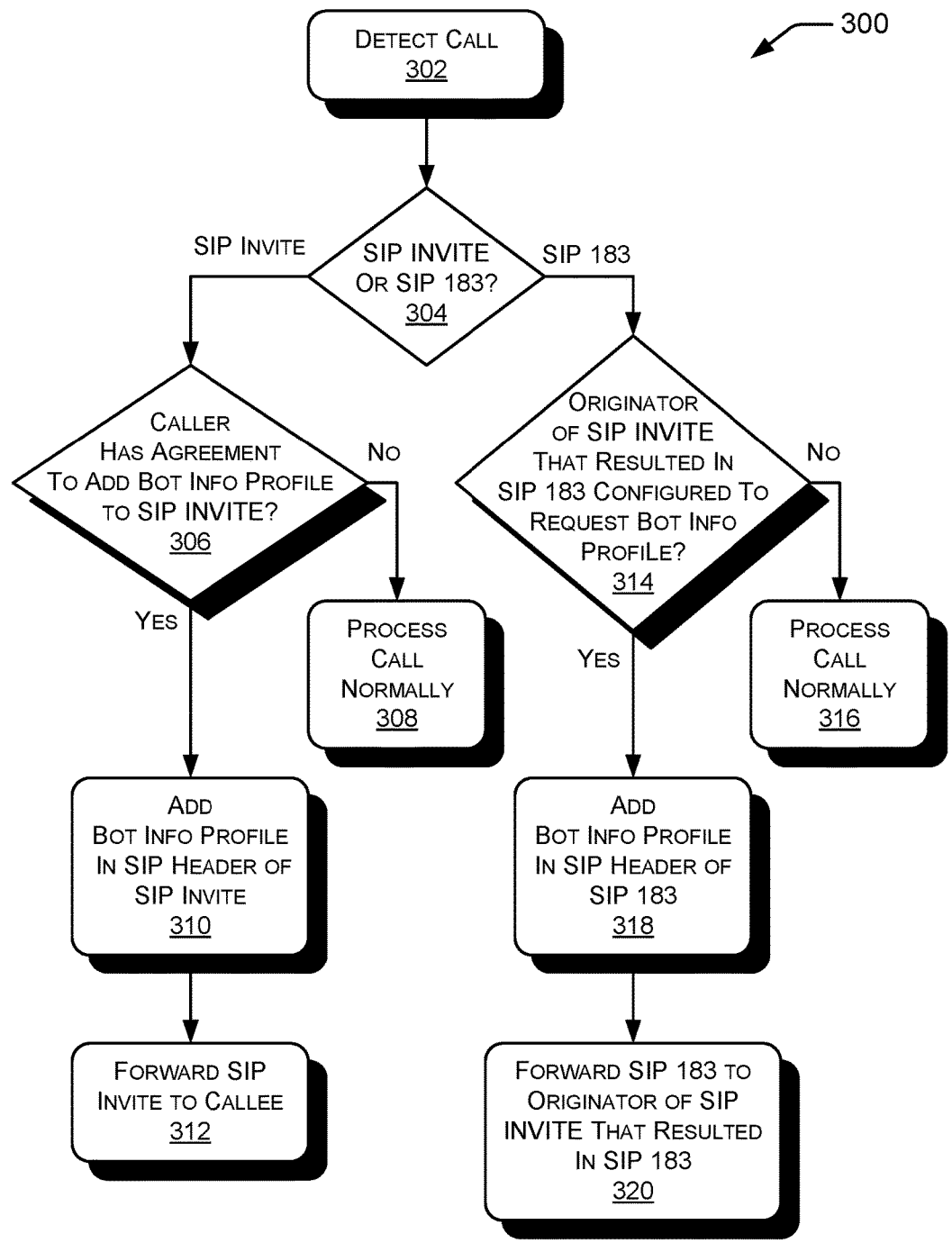
FIG. 3 illustrates an example process of the server providing the bot information profile during the call set up.

FIG. 3 illustrates an example process 300 of a server (not shown) providing the bot information profile during the call set up. Depending on which UE initiates the call, the server may take a different role. For example, if the call were initiated by the customer UE 104 as illustrated in, and discussed with reference to, FIG. 1, the server would be equivalent to the T-TAS 120. If the call were initiated by the business UE 204 as illustrated in, and discussed with reference to, FIG. 2, then the server would be equivalent to the O-TAS 210.

At block 302, the server detects a call, and determines if the call is a SIP INVITE or SIP 182 response in block 304. If the call is a SIP INVITE, the server may determine whether the caller, i.e. the originator of the SIP INVITE, has an agreement with the network operator to add a bot information profile associated with the caller to the SIP INVITE in block 306. If there is no agreement, the call is processed normally in block 308. If there is an agreement, that is, the originator of the SIP INVITE is a business UE, then the server adds the bot information profile to the SIP header of the SIP INVITE in block 310. Alternatively, the server may proceed to block 310 upon determining that the call is a SIP INVITE and add the bot information profile of the caller if available. As discussed above with reference to FIG. 2, the server may insert the bot information profile to the SIP INVITE by inserting a PCC value, vCard, or a URL in the SIP header, each of which may identify the bot information profile associated with the business UE. The server then forwards the SIP INVITE with the bot information profile inserted in the SIP header to the callee, i.e. the customer UE, in block 312.

If the call is determined to be a SIP 183 response in block 304, then the server may determine whether the originator, i.e. the customer UE, of the SIP INVITE that resulted in the SIP 183 response received is configured to request a bot information profile associated with the callee in block 314. If the originator is not configured to request the bot information profile, the call is processed normally in block 316. If the originator is configured to request the bot information profile, then the server adds the bot information profile associated with to the SIP header of the SIP 183 response in block 318. Alternatively, upon determining that the call is a SIP 183 response in block 304, the server may proceed to block 318 and add the bot information profile of the caller, i.e. the business UE, if available. As discussed above with reference to FIG. 1, the server may insert the bot information profile to the SIP 183 response by inserting a PCC value, vCard, or a URL in the SIP header, each of which may identify the bot information profile associated with the business UE. The server then forwards the SIP INVITE with the bot information profile inserted in the SIP header to the originator of the SIP INVITE that resulted in the SIP 183 response, i.e. the customer UE, in block 320.

Figure 4:
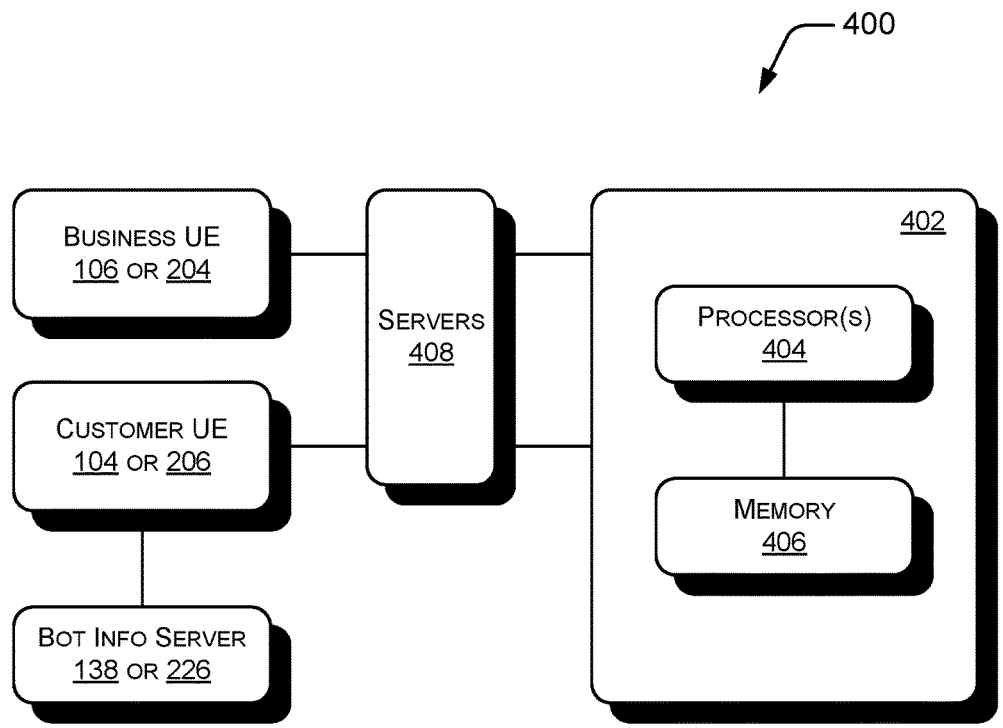
FIG. 4 illustrates an example block diagram of a server that provides a bot information profile used for discovering the bot functionality available from the entity by the UE during a call set up.

FIG. 4 illustrates an example block diagram 400 of a server 402 that provides a bot information profile used for discovering the bot functionality available from the entity, the business UE, by the customer UE during a call set. As discussed above with reference to FIG. 3, depending on which UE initiates the call, the server 402 may take a different role. For example, if the call were initiated by the customer UE 104 as illustrated in FIG. 1, the server 402 would be equivalent to the T-TAS 120, and if the call were initiated by the business UE 204 as illustrated in FIG. 2, the server 402 would be equivalent to the O-TAS 210. The customer UE 104 or 206 may also be couple to a bot information server, such as the bot information server 138 or 226.

The server 402 may comprise one or more processors 404 and a memory 406 communicatively coupled to the one or more processors 404. The server 402 may be coupled to a customer UE, such as the customer UE 104 or 206, and to a business UE, such as the business UE 106 or 204, via several servers 408 such as an O-TAS, an O-IMS, T-IMS, and T-TAS as discussed above with reference to FIGS. 1 and 2.

The memory 406 may store computer-readable instructions executable by the one or more processors 402, that when executed by the one or more processors 402, may cause the server 402 to perform certain operations described below. As described above with reference to FIG. 3, the server 402 may detecting a call destined to a UE, a customer UE or a business UE, and add or insert a bot information profile associated with the bot functionality of the business UE in a SIP header of a SIP INVITE or a SIP 183 response based on the originator of the call. As discussed above, the server 402 may insert the bot information profile to the SIP INVITE 208 by inserting a PCC value, vCard, or a URL in the SIP header, each of which may identify the bot information profile associated with the business UE. The server 402 may then forwarding the call, the SIP INVITE or SIP 183 with the bot information profile in the SIP header, to the customer UE, and provide the bot information profile to the customer UE.

The server 402 may also evaluate the originator of the SIP INVITE or SIP 183 response that it received and determine whether to add, or insert, the bot information profile to the SIP header based on whether the customer UE is configured to request, or has an agreement with the operator of the communication network to add, the bot information profile in the SIP header, or whether the business UE has an agreement with the operator to add the bot information profile to the SIP header of the SIP INVITE.

Upon detecting an acceptance from the customer UE for the bot functionality of the business UE based on the bot information profile, the server 402 may cause the customer UE to download an application associated with the bot functionality associated with the business UE.

Some or all operations of the methods described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1-4. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for a first user equipment (UE) to discover a bot functionality of a second UE, the method comprising:
   detecting, at a server of a communication network, a call destined to the first UE;
   adding to the call, by the server, a bot information profile associated with the bot functionality of the second UE;
   forwarding the call to the first UE; and
   providing the bot information profile to the first UE,
   wherein the bot information profile enables the first UE to download the bot functionality.

2. A method of claim 1 further comprising:
   downloading, by the first UE, the bot functionality based on the bot information profile.

3. A method of claim 1, wherein the call is initiated using one of:

a session initiation protocol (SIP),
a phone call,
an instant messaging, or
a uniform resource indicator (URI).

4. A method of claim 3, wherein adding, to the call by the server, the bot information profile associated with the second UE comprises:
inserting, by the server, the bot information profile in a SIP header of the call.

5. A method of 4, wherein inserting, by the server, the bot information profile in the SIP header of the call comprises:
inserting a personal contact card (PCC) value in the SIP header, the PCC value identifying the bot information profile,
inserting a vCard in the SIP header, the v-card identifying the bot information profile, or
inserting a uniform resource locator (URL) in the SIP header, the URL linking to the bot functionality downloadable for the first UE.

6. A method of claim 1, wherein:
the call is initiated by the second UE, and the server is an originating telephony application server (O-TAS) of the communication network, or
the call is a response destined to the first UE from the second UE in response to receiving an initiating call from the first UE by the second UE, and the server is a terminating telephony application server (T-TAS) of the communication network.

7. A method of claim 6, further comprising:
downloading, by the first UE, the bot functionality based on the bot information profile; and
establishing communication between the first UE and the second UE using the bot functionality.

8. A method of claim 6, wherein:
the second UE is configured to have an operator of the communication network add the bot information profile to the call, or
the first UE is configured to request the operator to add the bot information profile to the call, if the call is the response destined to the first UE from the second UE.

9. A non-transitory computer storage medium storing computer-readable instructions executable by a computer, that when executed by the computer, cause the computer to perform operations comprising:
detecting, at a server of a communication network, a call destined to a first UE;
adding to the call, by the server, a bot information profile associated with the bot functionality of a second UE;
forwarding the call to the first UE; and
providing the bot information profile to the UE,
wherein the bot information profile enables the first UE to download the bot functionality.

10. A non-transitory computer storage medium of claim 9, wherein the operations further comprise:
upon detecting an acceptance from the first UE for the bot functionality of the second UE based on the bot information profile, causing the first UE to download the bot functionality based on the bot information profile.

11. A non-transitory computer storage medium of claim 9, wherein the call is initiated using one of:
a session initiation protocol (SIP),
a phone call,
an instant messaging, or
a uniform resource indicator (URI).

12. A non-transitory computer storage medium of claim 11, wherein adding, to the call by the server, the bot information profile associated with the second UE comprises:
inserting a personal contact card (PCC) value in a SIP header of the call, the PCC value identifying the bot information profile,
inserting a vCard in the SIP header, the v-card identifying the bot information profile, or
inserting a uniform resource locator (URL) in the SIP header, the URL linking to the bot functionality downloadable for the first UE.

13. A non-transitory computer storage medium of claim 9, wherein:
the call is initiated by the second UE, and the server is an originating telephony application server (O-TAS) of the communication network, or
the call is a response destined to the first UE from the second UE in response to receiving an initiating call from the first UE by the second UE, and the server is a terminating telephony application server (T-TAS) of the communication network.

14. A non-transitory computer storage medium of claim 13, wherein the operations further comprise:
upon detecting an acceptance from the first UE for the bot functionality of the second UE based on the bot information profile,
causing the first UE to download the bot functionality based on the bot information profile; and
establishing communication between the first UE and the second UE using the bot functionality.

15. A non-transitory computer storage medium of claim 13, wherein:
the second UE is configured to have an operator of the communication network to add the bot information profile to the call, or
the first UE is configured to request the operator add the bot information profile to the call, if the call is a response destined to the first UE from the second UE.

16. A server in a communication network configured to allow a first user equipment (UE) to discover a bot functionality of a second UE, the system comprising:
one or more processors;
memory communicatively coupled to the one or more processors, the memory storing computer-readable instructions executable by the one or more processors, that when executed by the one or more processors, cause the server to perform operations comprising:
detecting a call destined to the first UE;
adding to the call a bot information profile associated with the bot functionality of the second UE;
forwarding the call to the first UE; and
providing the bot information profile to the first UE, wherein the bot information profile enables the first UE to download the bot functionality.

17. A server of claim 16, wherein the operations further comprise:
upon detecting an acceptance from the first UE for the bot functionality of the second UE based on the bot information profile, causing the first UE to download the bot functionality based on the bot information profile.

18. A server of claim 16, wherein the call is initiated using one of:
a session initiation protocol (SIP),
a phone call,
an instant messaging, or
a uniform resource indicator (URI).

19. A server of claim 18, wherein adding to the call the bot information profile available associated with the call comprises:
- inserting a personal contact card (PCC) value in a SIP header of the call, the PCC value identifying the bot information profile,
- inserting a vCard in the SIP header, the v-card identifying the bot information profile, or
- inserting a uniform resource locator (URL) in the SIP header, the URL linking to the bot functionality downloadable for the first UE.

20. A server of claim 16, wherein:
- the call is initiated by the second UE, the second UE being configured to have an operator of the communication network add the bot information profile to the call, and the server is an originating telephony application server (O-TAS) of the communication network, or
- the call is a response destined to the first UE from the second UE in response to receiving an initiating call from the first UE by the second UE, the first UE being configured to request the operator to add the bot information profile to the call, and the server is a terminating telephony application server (T-TAS) of the communication network.

* * * * *